United States Patent [19]

Suggs

[11] 4,107,902
[45] Aug. 22, 1978

[54] LEAF DEFOLIATOR ASSEMBLY FOR AN AUTOMATIC TABACCO HARVESTER

[76] Inventor: Charles W. Suggs, 1507 Trailwood Dr., Raleigh, N.C. 27606

[21] Appl. No.: 738,834

[22] Filed: Nov. 4, 1976

[51] Int. Cl.$^2$ .......................................... A01D 45/16
[52] U.S. Cl. .................................................. 56/27.5
[58] Field of Search ................... 56/27.5, 249, 53–63, 56/30, 33, DIG. 1

[56] References Cited

U.S. PATENT DOCUMENTS

| | | | |
|---|---|---|---|
| 2,076,598 | 4/1937 | Rust et al. | 56/40 |
| 2,674,080 | 4/1954 | Wilson | 56/30 |
| 2,701,438 | 2/1955 | Sawyer et al. | 56/33 |
| 3,241,216 | 3/1966 | Wellendorf | 56/DIG. 1 |
| 3,601,959 | 8/1971 | Pinkham | 56/27.5 |
| 3,701,240 | 10/1972 | Wise et al. | 56/63 |
| 3,717,982 | 2/1973 | Meiners | 56/63 |
| 3,885,376 | 5/1975 | Johnson | 56/27.5 |
| 3,962,850 | 6/1976 | Moore | 56/27.5 |
| 4,035,998 | 7/1977 | Griner et al. | 56/27.5 |

FOREIGN PATENT DOCUMENTS 673,306  6/1952  United Kingdom .................... 56/63

Primary Examiner—Russell R. Kinsey
Attorney, Agent, or Firm—Mills & Coats

[57] ABSTRACT

A tobacco harvester having an aggressive defoliating assembly along with a forward projecting leaf divider assembly that effectively divides a lower group of leaves from remaining leaves of each stalk entering the defoliating assembly during the tobacco harvesting operation. This division enables the defoliator assembly to more effectively and efficiently defoliate the lower group of separated leaves from each stalk passing through the defoliator assembly. When utilized in the form of a tractor mounted harvester, the tobacco harvester of the present invention includes a unique split or half lateral conveyor assembly that enables the harvester to be closely mounted adjacent one side of a conventional farm tractor despite the presence of the tractor's front wheel which with certain sized tractors prevent the utilization of conventional conveyor design without necessitating extra wide width tractor passing rows in the tobacco field.

1 Claim, 11 Drawing Figures

LEAF DEFOLIATOR ASSEMBLY FOR AN AUTOMATIC TABACCO HARVESTER

The present invention relates to agricultural harvesting machinery, and more particularly to a leaf defoliator assembly for an automatic tobacco harvester.

BACKGROUND OF THE PRESENT INVENTION

Automatic tobacco harvesters are now in wide use, especially in the flue-cured tobacco production regions of the United States. In an automatic tobacco harvester one finds the heart of the harvester to be the leaf defoliating and leaf conveying assemblies. The defoliating assembly defoliates the leaves from respective stalks passing through the defoliator assembly, while the conveying assemblies disposed adjacent the defoliator assembly conveys the defoliated leaves away from the defoliator assembly toward an area where the leaves are collected.

Charles W. Suggs, the Inventor of the present invention, developed what is often referred to as the rubber spiral type defoliator, shown in U.S. Pat. No. 2,834,174. The Suggs' rubber type spiral defoliators have been and are presently extensively used in production tobacco harvesters manufactured and sold in the United States, Canada and other tobacco producing areas of the world. While such defoliators have performed more than satisfactorily, it is known and appreciated that some field losses can occur with these spiral type defoliators and other types of leaf defoliators as well. Various supporting defoliating mechanisms such as scavengers and gleaners have been added to the basic defoliating mechanism of tobacco harvesters to help minimize field losses. See U.S. Pat. Nos. 3,955,345, 3,955,357 and 3,841,071 for examples of these and other devices that have been devised and employed in tobacco harvesters to minimize field losses.

Tobacco leaves generally grow outwardly from the tobacco stalks horizontally, and in the harvesting operation with defoliators such as the Suggs' spiral type, all tobacco leaves passing below the defoliators become a part of the defoliated swath. However, with certain varities of tobacco and in crops exposed to certain environmental conditions, one finds that certain leaves on the stalks tend to extend generally upwardly along side the stalk, as contrasted to the normal horizontal extension. In such cases leaves that would usually be a part of the defoliated swath extend and curl over the defoliators because of their upward extension angle, and consequently during the harvesting operation these leaves escape defoliation during the harvesting operation.

Finally, the vast majority of automatic tobacco harvesters being used today are of the self-propelled type which generally are used by relatively large farmers, many of which farm 40 or more acres of tobacco. Nevertheless, there remains many smaller tobacco farmers who also encounter labor problems and who have a need for an automatic tobacco harvester, but cannot justify the cost of a self-propelled model because of the small acreage of tobacco being tended. This emphasizes the need for an efficient tractor mounted tobacco harvester, wherein the tobacco harvester would be designed and adapted to readily mount to an already accessible tractor on the farm. By utilizing an already accessible tractor as the prime mover for the harvester, the cost to the small tobacco farmer for the tractor mounted tobacco harvester would be substantially reduced and the cost thereof could in many cases be justified.

SUMMARY OF THE INVENTION

The present invention presents a defoliator assembly for a tobacco harvester that includes an improved, more aggressive leaf defoliator mechanism that is intended to minimize field losses during the tobacco harvesting operation. The improved leaf defoliator mechanism of the present invention employs a leaf shearing principle as one or more rotating defoliators of the present invention cooperate with an adjacent shearing surface to pinch, cut, or pull leaves from stalks during the harvesting operation. Generally such a shearing type defoliation action is realized about the rear area of the defoliator assembly of the present invention, and occurs as tobacco leaves pass between a respective rotating defoliator and the adjacent shearing surface.

In addition, the defoliator assembly of the present invention is provided with a forwardly projecting leaf or swath separator which during the harvesting operation separates a lower swath of leaves about each entering stalk and guides the separated leaves of the swath underneath the defoliators of the defoliator assembly thereby assuring leaf defoliation from a desired stalk level downwardly.

Finally the present invention discloses a novel combination leaf catching and conveying assembly for a tobacco harvester that mounts directly and closely adjacent one side of a farm tractor. This tractor mounted harvester includes leaf defoliators of a normal longitudinal length, a front leaf receiving or catching assembly disposed generally below and adjacent a forward portion of each defoliator, and a half or split lateral conveyor disposed rearwardly of each front leaf catching assembly for conveying defoliated leaves laterally to an adjacent longitudinal conveyor assembly. Defoliated leaves that fall on the front leaf catching assembly are generally swept rearwardly onto the half lateral conveyor by lower leaves of the swath intended to be defoliated but not yet defoliated. The front leaf catching assembly and the half or split lateral conveyor enables the harvester to be mounted closely adjacent a conventional tractor such that the tractor and mounted harvester may pass through a single skip row provided in the field for that purpose.

It is, therefore, an object of the present invention to provide a tobacco harvester having a more aggressive and efficient defoliating system that will generally minimize field losses during the tobacco harvesting operation.

A further object of the present invention is to provide a defoliator assembly for a tobacco harvester wherein the defoliator assembly employs a shearing type defoliating action along at least a portion of the effective defoliating area of the defoliator incorporated into said defoliator assembly.

Still a further object of the present invention is to provide a tobacco harvester with a positive leaf separating structure for separating a desired lower swath of leaves about each entering stalk from other leaves thereon and generally guiding the lower separated swath underneath the defoliators of the harvester for proper defoliation.

Another object of the present invention is to provide a tractor mounted tobacco harvester for relatively small and medium sized tobacco farmers wherein use can be made of an already accessible tractor owned by the farmer.

Other objects and advantages of the present invention will become apparent from a study of the following description and the accompanying drawings which are merely illustrative of the present invention.

With further reference to the drawings, a tobacco harvester unit shown therein, and indicated generally by the numeral 10. Tobacco harvester unit 10 will be described subsequently herein as embodied in a tractor mounted tobacco harvester, but those skilled in the art will appreciate that the basic tobacco harvester unit 10, the defoliator assembly and components thereof, as well as other components of the harvester unit could also be used in a conventional self-propelled automatic tobacco harvester such as the type shown and disclosed in U.S. Pat. No. 3,841,071, the contents thereof being expressly incorporated herein by reference.

Figure 1:
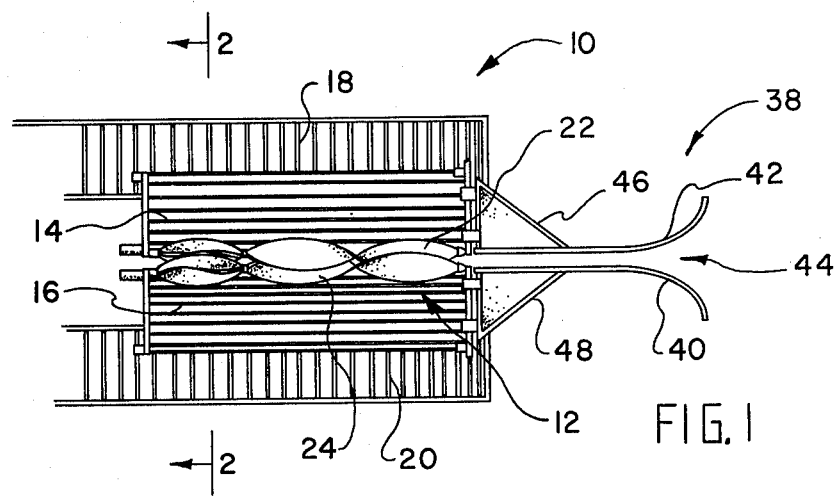
FIG. 1 is a top plan view of the defoliator assembly of the present invention employing a shear type leaf defoliating mechanism.

Generally viewing the tobacco harvester unit 10, as shown in FIG. 1, it is seen that the same includes a driven defoliator assembly, indicated generally by the numeral 12. Disposed generally below and adjacent the defoliator assembly 12 is a pair of lateral conveyor assemblies 14 and 16 which function to receive defoliated leaves during the tobacco harvesting operation and to convey them laterally from the defoliator assembly to an adjacent longitudinal conveyors 18 and 20.

Figure 7:
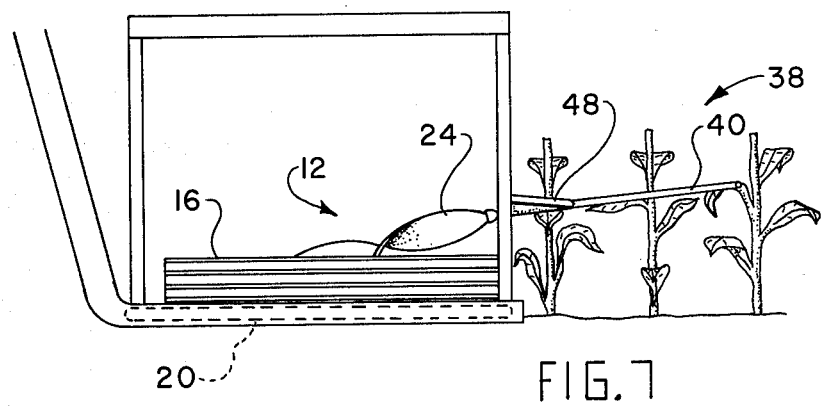
FIG. 7 is a fragmentary side elevational view of a tobacco harvester having the leaf divider assembly of the present invention projecting forwardly therefrom.

Defoliator assembly 12 includes a pair of rubber or resilient like spiral defoliators 22 and 24 that extend generally fore-and-aftly at a slight rearward and downward incline about the harvester unit 10, as best seen in FIGS. 1 and 7. Defoliators 22 and 24 are laterally spaced apart so as to define a row opening therebetween to enable stalks to pass between the two defoliators during the tobacco harvesting operation. Defoliators 22 and 24 are preferably hydraulically driven in conventional fashion and are typically driven counter to each other in a manner indicated by directional arrows in FIGS. 2–3. Details of the spiral type defoliators are not dealt with herein because such are well appreciated in the art. For a complete and unified understanding of the spiral type defoliators, one is referred to U.S. Pat. No. 2,834,174, the contents thereof being expressly incorporated herein by reference.

To achieve a more efficient defoliating action that tends to minimize field losses, the present invention introduces a shear type defoliating action that is achieved by the utilization of a shearing surface that operates in conjunction with at least a portion of each defoliator 22 or 24, and this shearing action is generally achieved about the rear portion of the defoliator assembly 12. In this regard and with reference to FIG. 2, one species for this shearing type defoliating action is shown and in this embodiment the rear lower portion of the spiral defoliators 22 and 24 cooperate with the adjacent upper portion of the respective lateral conveyors 14 and 16. More specifically, the lateral conveyors 14 and 16 are of the chain link type and when positioned as suggested by FIG. 2, the lower portions of the rotating defoliators 22 and 24 engage a portion of the chain link conveyor which imparts a very aggressive cooperative shearing action to tobacco leaf material that may extend between the respective defoliators 22 and 24 and the underlying lateral conveyor assemblies 14 or 16. This aggressive shearing type defoliating action is very effective in cleaning and defoliating what tobacco leaf material may be left on the stalk that forms a part of the intended or target swath to be defoliated. It should be pointed out that with respect to lateral conveyors 14 and 16, that each is provided with an inner idler assembly 26 and 28 that has the chain link conveyors trained therearound. For details of this structure and the relationship therewith with other components of the defoliator head assembly, one is again referred to U.S. Pat. No. 3,841,071.

Figures 2, 3:
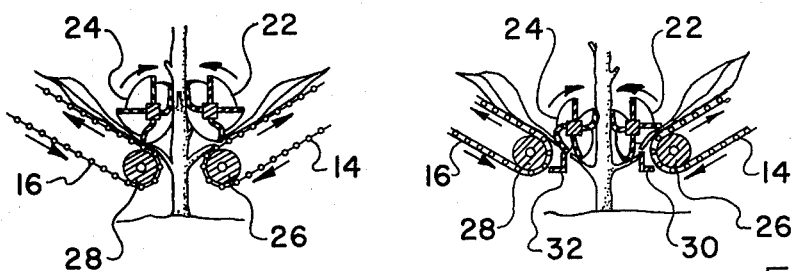
FIG. 2 is an enlarged cross sectional view taken along the lines 2—2 in FIG. 1 and which illustrates a first species shear type defoliating assembly.
FIG. 3 is a cross sectional view similar to FIG. 2, but illustrating a shear type defoliating assembly of a second species.

Turning to FIG. 3, a second species is shown for the shear type defoliating assembly of the present invention. In this case, the lateral conveyors 14 and 16 are moved slightly outwardly from the position occupied in the first species, as shown in FIG. 2 and thus they are spaced farther apart. But to give the defoliator assembly a shearing type defoliating action about the rear portion thereof, there is provided below each defoliator 22 and 24 a shear bar 30 and 32. Each of the shear bars 30 and 32 extend underneath the respective defoliators 22 and 24 and are preferably of an angle iron shape such as shown in FIG. 3, with the upper edge portion serving as a cutting edge or shearing blade. In this case, the lower portions of the defoliators 22 and 24 engage and cooperate with the upper edge portions of the shear bars 30 and 32 to effectuate a shearing type defoliating action on leaves that pass between the defoliators 22 and 24 and the respective shear bars 30 and 32.

Figure 4:
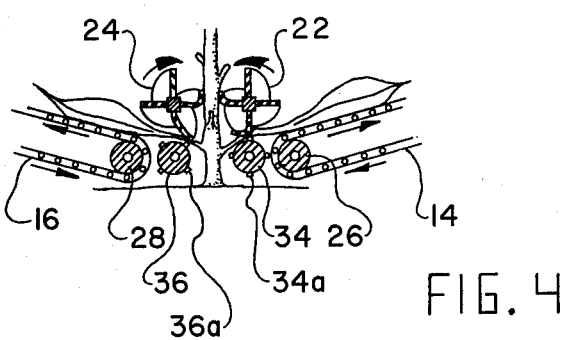
FIG. 4 is a cross sectional view again similar to FIG. 2, but illustrating a shear type defoliating assembly of a third species.

Now with reference to FIG. 4 and a third species for the shearing type defoliating assembly of the present invention, it is seen that this species includes a pair of driven shear rollers 34 and 36 that are disposed generally below respective defoliators 22 and 24. Each of the shear rollers 34 and 36 are aggressive in nature because of the presence of bosses or ripples 34a and 36a that are circumferentially disposed about the rollers 34 and 36 and engagable with the defoliators 22 and 24 during the defoliating operation. Like the other two species, the defoliators 22 and 24 engage and cooperate with the rollers 34 and 36 to provide a shearing type defoliating action on leaves that pass therebetween during the harvesting operation.

Figure 5:
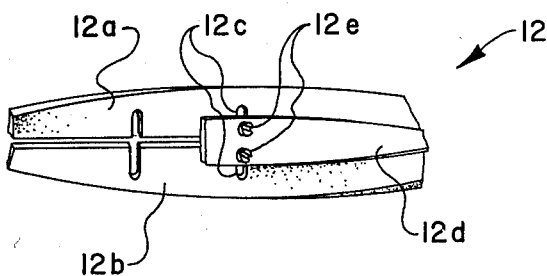
FIG. 5 is a fragmentary side view of a spiral type defoliator incorporating means to adjust the effective width of the web portion comprising the defoliator.
Figure 6:
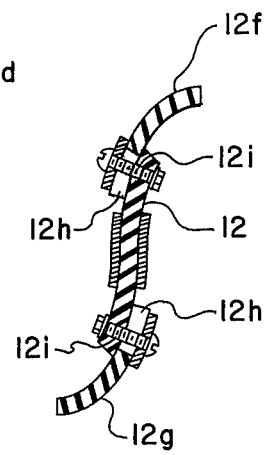
FIG. 6 is an enlarged cross sectional view of the spiral type defoliator shown in FIG. 5.

With respect to FIGS. 5 and 6, there is seen two portions of a respective defoliator 12 that are provided with means for varying the effective width of the defoliator in an area where the shearing type defoliating is accomplished on the harvester. The ability to vary the effective width of a respective defoliator 22 and 24 in the cases of the three species outlined above enables the operator of the harvester to adjust portions of the defoliators with respect to the underlying cooperating shearing surfaces. By adjusting the effective width of the defoliators to a minimum, engagement of the defoliators with the underlying shearing surfaces can be avoided. On the other hand, the width of the defoliators may be adjusted to where the same extends into full engagement with the underlying shearing surface.

With reference to FIG. 5, it is seen that one form for providing this adjustable width defoliator comprises a defoliator 12 having webs 12a and 12b that are supported and held by an elongated rib 12d. Each defoliator web 12a and 12b is provided with an elongated adjustment slot 12c with a bolt assembly 12e extending through the slot 12c and through the rib 12d. Thus, it is seen that each web 12a and 12b can be extended outwardly or inwardly with respect to each other so as to effectively adjust the diameter or width of the defoliator.

In FIG. 6, the defoliator 12 is provided with extension webs or wiper means 12f and 12g that are provided with adjustment slots 12h and wherein there is provided a bolt assembly 12i that extends between each web extension 12f and 12g through a portion of the defoliator 12. By loosening the bolt assemblies 12i, the extension webs 12f and 12g can be adjusted outwardly or inwardly to effectively vary the diameter or width thereof.

As seen in FIGS. 1, 7, 8 and 9, the tobacco harvester unit 10 is provided with a forwardly projecting leaf divider assembly, indicated generally by the numeral 38. Divider assembly 38 extends between respective leaves of each stalk and is intended to separate a lower target swath of leaves on each successive stalk passing into the defoliator assembly from other upper disposed leaves. The divider assembly 38 is preferably adjusted disposed at a slight angle such as illustrated in FIG. 7 such that the leaves passing thereunder will be engaged and generally pressed down such that the leaves will pass underneath each of the defoliators 22 and 24. This allows the entire swath of leaves that fall below the divider assembly 38 to be effectively defoliated during a pass of the harvester.

Figure 8:
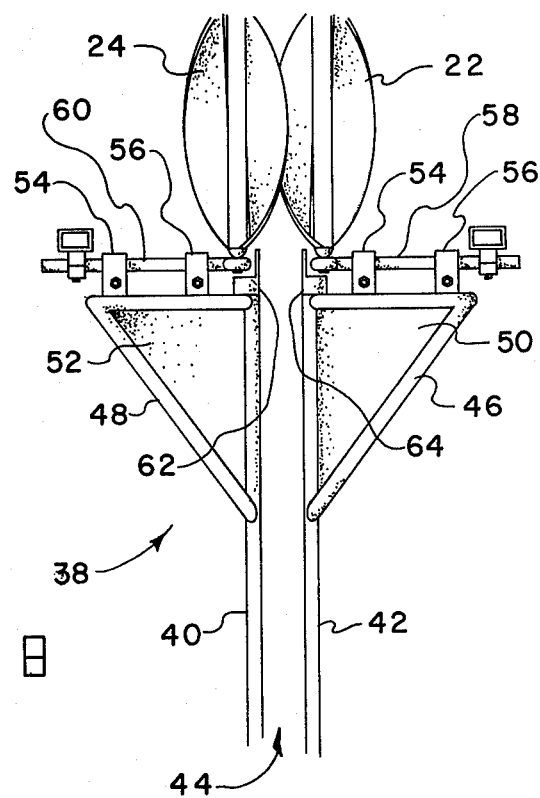
FIG. 8 is a fragmentary plan view of the leaf divider assembly.
Figure 9:
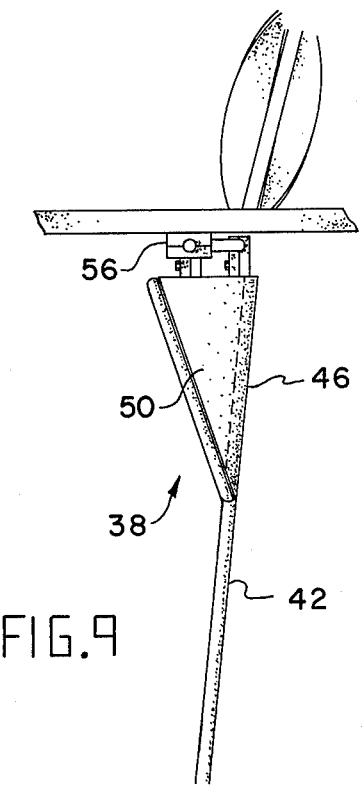
FIG. 9 is a fragmentary side elevational view of the leaf divider assembly.

Viewing the divider assembly 38 in detail, it is seen that the same includes a pair of laterally spaced divider rods 40 and 42 that project forwardly from the front of the defoliator assembly and are so spaced so as to define a stalk or row passageway 44 therebetween. Formed about the rearward outer sides of rods 40 and 42 is a pair of angle wing assemblies 46 and 48, each wing assembly including a wing plate 50 and 52 as best seen in FIG. 8. The rear portion of each wing assembly 46 and 48 includes a pair of adjustable connecting clamps 54 and 56 that enable respective halves of the divider assemblies 38 to be connected to one of the front defoliator support rods 58 and 60 that is supported by the defoliator frame structure (not shown) and which acts to support in a bearing relationship the front tips of each defoliators 22 and 24. It is noted that this manner of mounting the divider assembly 38 means that the divider assembly extends forwardly from the front tips of the defoliators 22 and 24, and is in effect an extension thereof. To prevent stalks from gumming up the front bearing tips of the defoliators 22 and 24 and for generally preventing interference therewith, a pair of block guides 62 and 64 are suitably secured about the rearward areas of the divider assembly 38, again as best seen in FIGS. 8 and 9.

The divider assembly 38 just described is effective to engage upwardly growing leaves that form an upper part of the intended or target swath. The rods 40 and 42 tend to gently move the upwardly growing leaves downwardly such that the front ends of the defoliators 22 and 24 move completely above and over the upper leaves of the target swath. This assures that the defoliators 22 and 24 will engage and operate on the entire target swath from the top downwardly, and that the leaves about the top portion of the target swath will not escape defoliation due to an upward inclined growth that causes the leaf to almost grow parallel to the stalk but in an upper fashion.

Figure 10:
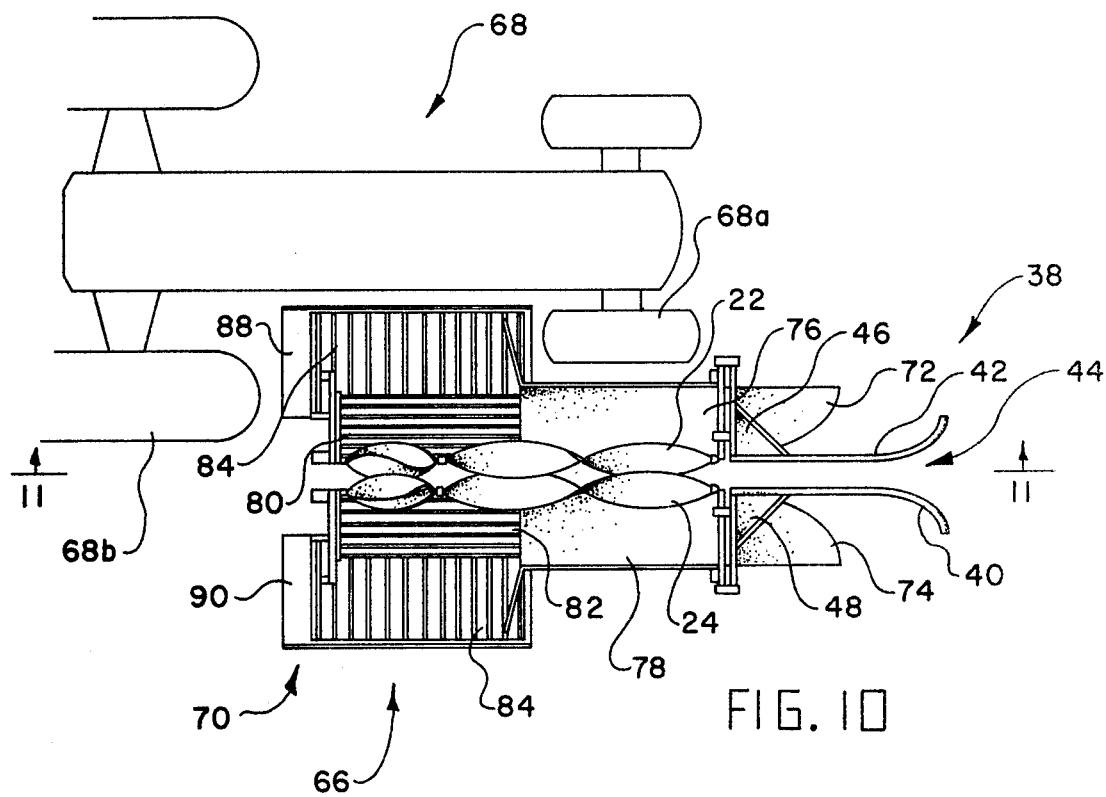
FIG. 10 is a diagrammatic illustration of the tractor mounted tobacco harvester of the present invention, basically illustrating the normal inside position occupied by the harvester assembly adjacent the tractor.
Figure 11:
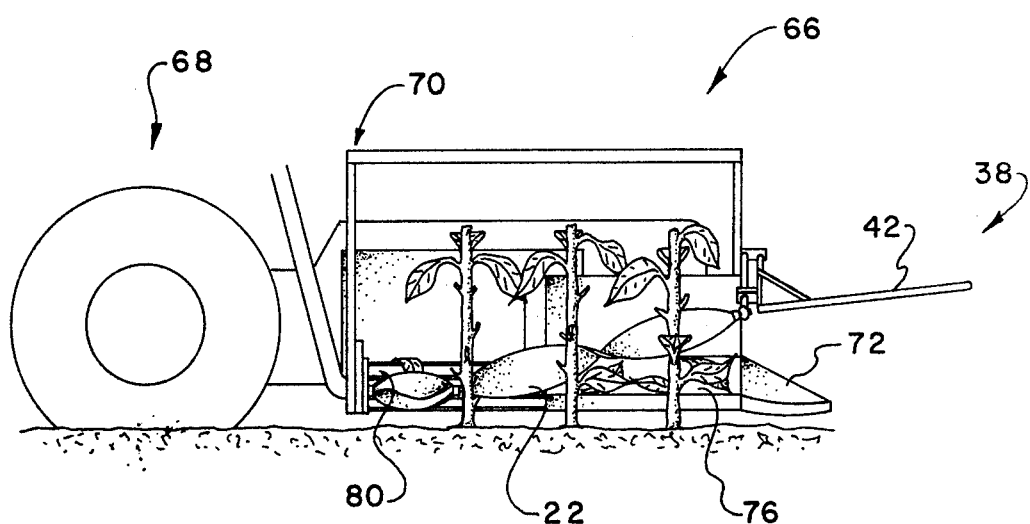
FIG. 11 is a side elevational view taken along the lines 11—11 of FIG. 10.

With reference to FIGS. 10 and 11, a tobacco harvester or defoliator header, indicated generally by the numeral 66, is shown diagrammatically in conjunction with a conventional farm tractor indicated generally by the numeral 68. The design of the defoliator header 66 and associated frame structure (not completely shown) is particularly adapted to be readily attachable to a farm tractor, such as indicated above by numeral 68, and to be powered and supported by the tractor during the harvesting operation. The important and key feature of the defoliator header 66 is the particular design of the leaf catching and conveying assemblies disposed adjacent the defoliators 22 and 24 that operate to receive and convey the defoliated leaves from the area of defoliation to an area where the leaves are collected.

With this in mind and with reference to FIGS. 10 and 11, it is seen that the defoliator header assembly 66 includes a main frame structure indicated generally by the numeral 70. It will be appreciated by those skilled in the art that the main frame structure 70 that supports the defoliator header 66 could be properly and easily detachably secured to the tractor 68 by conventional support means. Details of the particular connection are not dealt with herein in detail because it is known by those skilled in the art that such defoliator assemblies could be properly connected to the tractor 68 by conventional means.

Referring now to the structure of the defoliator header 66, it is seen that the same includes a pair of lower stalk guide plate assemblies 72 and 74 projecting forwardly about the lower portion of the header. Disposed generally below and to each side of the forward portions of the defoliators 22 and 24 is a pair of leaf catching panels indicated by the numerals 76 and 78. It is seen that these leaf catching panels 76 and 78 extend from the front part of the defoliators 22 and 24 to a point generally midway of the length of the defoliators 22 and 24 when viewed in plan, as in FIG. 10. The leaf catching panels 76 and 78 may be generally inclined slightly downwardly with the inner portions thereof serving to define the plant passageway and being disposed beneath the defoliators 22 and 24.

Disposed adjacent the rear edge of the leaf catching panels 76 and 78 are a pair of driven lateral leaf conveyors 80 and 82 that serve to convey and transfer defoliated tobacco leaf material outwardly from the area of the defoliation onto adjacent longitudinal driven conveyors 84 and 86. The defoliator header assembly 66 and the tobacco harvesting unit comprises a pair of vertical conveyors 88 and 90 which serve to elevate the tobacco leaves conveyed thereto by the longitudinal conveyors 84 and 86 upwardly a selected height where the tobacco harvester is provided with other conventional conveying means and even cross conveying means for eventually conveying the defoliated tobacco leaf material back into a trailer (not shown) pulled by the tractor 68 or to some other conventional tobacco leaf collecting means.

Heretobefore with tobacco harvesters both the lateral conveyor assemblies and the longitudinal conveyors referred to above have always been of a width or length at least equal to the effective longitudinal distance of the defoliators 22 and 24 which would in the case of FIG. 10 be a distance at least equal to the horizontal distance between the front and rear terminal ends of the defoliators 22 and 24. But in the case of the present invention after much study, it became apparent that the longitudinal conveyor assembly adjacent the tractor would have to be in the plane of the tractor's front wheel if the width of the tractor and harvester were to be kept within desirable limits. At the same time, it became apparent that if a satisfactory and efficient defoliating action was to be achieved that the horizontal length of the defoliator 22 and 24 would be such that the front portions of the defoliators would have to project along side of the adjacent tractor front wheel 68a. From this it became apparent that a problem existed with respect to transferring the front defoliated leaves back to the respective longitudinal conveyor assemblies, especially in FIG. 10 on the side adjacent the tractor or on the side of the defoliator 22. This problem was solved by the provision of the half lateral conveyor assemblies 80 and 82 in conjunction with the leaf catching panels 76 and 78. Tobacco leaves defoliated about the front portion of the defoliator header 66 would be leaves about the upper portion of the target swath because of the rearward inclination of the defoliator assemblies. Consequently it was reasoned and discovered that the lower leaves of the target swath would not be defoliated until they had reached the rear area of the defoliator header 66. This meant that the lower leaves would be in a position to engage and sweep across the leaf collecting panels 76 and 78 during the harvesting operation. This sweeping action of the lower leaves of the target swath then would engage upper leaves already defoliated and deposited on the leaf catching panels 76 and 78, and this engagement or sweeping action would result in the defoliated leaves on the leaf catching panels 76 and 78 being swept or conveyed back onto the respective lateral conveyors 80 and 82, as particularly illustrated in FIG. 11. Consequently, then the design just described for the defoliator header 66 and shown in FIGS. 10 and 11 will enable a tractor mounted tobacco harvester unit to be mounted closely adjacent to a respective tractor to minimize the effective width thereof in order that the same could pass through normal width skip rows and yet maintain a satisfactory tobacco harvesting operation despite the fact that both the lateral and longitudinal conveyor assemblies, at least on the tractor side of the harvester, might not extend the effective horizontal full length of the defoliators 22 and 24.

The terms "upper", "lower", "forward", "rearward", etc., have been used herein merely for the convenience of the foregoing specification and its parts as oriented in the tobacco harvester and its parts as oriented in the drawings. It is to be understood, however, that these terms are in no way limiting to the invention since the tobacco harvester may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A tobacco harvester unit adapted to be mounted and supported adjacent one side of a tractor, said tobacco harvester unit comprising: a frame structure; rotatively driven leaf defoliation means extending generally longitudinally within said harvester unit and including rear and front ends; lateral conveyor means disposed on each side of said harvester unit generally adjacent the rear areas of said defoliating means, said lateral conveyor means extending on each side of said harvester unit from the rear area of said defoliating means forwardly where the lateral conveyor means terminates generally intermediately between the front and rear ends of said defoliator means; longitudinal conveyor means disposed outwardly adjacent said lateral conveyor means for receiving tobacco leaf material therefrom; and a front stationary leaf receiving panel adjoining said lateral conveyor means on each side of said harvester unit just generally below and adjacent the front portion of said defoliating means, said front stationary leaf receiving panel serving to catch and receive leaves initially defoliated from the upper portion of the target swath during the harvesting operation and wherein tobacco leaves remaining about the lower portion of the target swath act to engage and sweep these received leaves disposed on each of said stationary leaf receiving rearwardly onto said adjacent lateral conveyor means where the leaves are conveyed laterally onto said outwardly adjacent longitudinal conveying means.

* * * * *